US011080347B2

(12) United States Patent
Huo et al.

(10) Patent No.: US 11,080,347 B2
(45) Date of Patent: Aug. 3, 2021

(54) METHOD AND APPARATUS FOR SENDING SEARCH REQUEST (71) Applicant: HUAWEI TECHNOLOGIES CO., LTD., Guangdong (CN)

(72) Inventors: Dawei Huo, Shenzhen (CN); Li Qian, Shenzhen (CN); Xin Jiang, Hong Kong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 230 days.

(21) Appl. No.: 16/292,992

(22) Filed: Mar. 5, 2019

(65) Prior Publication Data

US 2019/0205348 A1 Jul. 4, 2019

Related U.S. Application Data (63) Continuation of application No. PCT/CN2016/098114, filed on Sep. 5, 2016.

(51) Int. Cl.
G06F 16/95 (2019.01)
G06F 16/9532 (2019.01)
H04L 29/08 (2006.01)
G06F 16/9032 (2019.01)
(Continued)

(52) U.S. Cl.
CPC .... *G06F 16/9532* (2019.01); *G06F 16/90332* (2019.01); *G06F 16/9538* (2019.01); *G06F 17/18* (2013.01); *H04L 67/02* (2013.01); *H04L 67/22* (2013.01)

(58) Field of Classification Search
None
See application file for complete search history.

(56) References Cited

U.S. PATENT DOCUMENTS 9,037,598 B1\* 5/2015 Morton ................. G06F 16/162
707/767
2008/0028463 A1\* 1/2008 Dagon ................... G06F 16/951
2009/0112805 A1\* 4/2009 Garbow .............. G06F 16/9535
(Continued)

FOREIGN PATENT DOCUMENTS

CN 102170432 A 8/2011
CN 103577464 A 2/2014
(Continued)

OTHER PUBLICATIONS

Guo, Yecai, "Stochastic Processes and control Theory" Weather Publishing House, Aug. 2013. With partial English translation. total 9 pages.
(Continued)

*Primary Examiner* — Son T Hoang
(74) *Attorney, Agent, or Firm* — Fish & Richardson P.C.

(57) ABSTRACT

Sending a search request includes: during a running procedure of a search engine client, generating a forged search request, where the forged search request carries a forged search word; and sending the forged search request to the search engine server. The forged search request is sent to the search engine server, to serve as a factor interfering with an analysis of a user behavior by the search engine server based on a true search request, to prevent the search engine server from analyzing the user behavior based on a search word entered by a user, thereby improving user experience.

10 Claims, 5 Drawing Sheets (51) Int. Cl.
G06F 16/9538 (2019.01)
G06F 17/18 (2006.01)

(56) References Cited

U.S. PATENT DOCUMENTS

2010/0169293 A1  7/2010 Gerber
2013/0282759 A1* 10/2013 Proux ............... G06F 16/951
2017/0337397 A1* 11/2017 Tang ............... G06F 16/9537

FOREIGN PATENT DOCUMENTS

| CN | 104184742 A | 12/2014 |
|----|-------------|---------|
| CN | 104507048 A | 4/2015 |

OTHER PUBLICATIONS

Chinese Office Action dated Apr. 29, 2019 in corresponding Chinese Patent Application No. 201680005833.4 (7 pages).
International Search Report dated May 31, 2017 in corresponding International Patent Application No. PCT/CN2016/098114 (7 pages).
Written Opinion of the International Searching Authority dated May 31, 2017 in corresponding International Patent Application No. PCT/CN2016/098114 (3 pages).
International Search Report dated May 31, 2017 in corresponding International Application No. PCT/CN2016/098114.

* cited by examiner

METHOD AND APPARATUS FOR SENDING SEARCH REQUEST

CROSS-REFERENCE TO RELATED APPLICATIONS

This application is a continuation of International Application No. PCT/CN2016/098114, filed on Sep. 5, 2016, the disclosure of which is hereby incorporated by reference in its entirety.

TECHNICAL FIELD

Embodiments of the present invention relate to the communications field, and more specifically, to a method and an apparatus for sending a search request.

BACKGROUND

A search engine server may record search history content of a user, analyze a behavior habit and an interest preference of the user by using a data mining algorithm, and push related advertisement information to the user accordingly. From the perspective of the user, a search word is often related to personal privacy, and the user does not want his or her behavior habit and interest to be analyzed and mined by the search engine server and does not want to receive a pushed related harassment advertisement.

In the prior art, the user may set a search engine client to be in a privacy mode. After the search engine client enters the privacy mode, the search engine client does not record any search word entered by the user. However, the search word entered by the user is carried in a search request and sent to the search engine server. A search engine server end may record the search word entered by the user and analyze a behavior and the interest of the user. In other words, even if the user sets the privacy mode, the search engine server can still analyze the behavior habit and the interest based on the search word entered by the user, consequently causing privacy information of the user to be leaked.

SUMMARY

An objective of this application is to provide an improved method and apparatus for sending a search request, to reduce a possibility that a search engine server analyzes a behavior habit and an interest preference of a user based on a search word entered by the user, so that user privacy is better protected.

According to a first aspect, this application provides a method for sending a search request. The method includes: during a running procedure of a search engine client, generating a forged search request, where the forged search request carries a forged search word; and sending the forged search request to the search engine server.

The forged search request is sent to the search engine server, to serve as a factor interfering with an analysis of a user behavior by the search engine server based on a true search request, to prevent the search engine server from analyzing the user behavior based on a search word entered by a user, thereby improving user experience. It is avoided that, in the prior art, a search engine server analyzes a user behavior based on a search word entered by a user.

With reference to the first aspect, in a possible implementation of the first aspect, the method further includes: receiving a search word entered by a user; and generating a true search request based on the search word entered by the user, and sending the true search request to the search engine server, where a time difference between the sending of the forged search request and the sending of the true search request is within a predetermined range.

A moment at which the forged search request is generated is relatively close to a moment at which the forged search request is sent, and the forged search request is generated within a time segment after the true search request is sent. Therefore, the moment at which the forged search request is sent is close to a moment at which the true search request is sent, thereby enabling the sending of the forged search request to be closer to a user behavior of sending the true search request.

With reference to any one of the first aspect or the foregoing possible implementation, in a possible implementation of the first aspect, the during a running procedure of a search engine client, generating a forged search request includes: determining a generation delay for generating the forged search request; determining that the search engine client does not send a first search request within a first time segment, where the first search request is a forged search request or a true search request, and the first time segment is a time segment that lasts for the generation delay and that starts from a running start moment of the search engine client that is used as a current moment; and generating the forged search request at an end moment of the first time segment.

It is determined that the search engine client does not send the search request to the search engine server within the first time segment. Then, the search engine client sends the forged search request to the search engine server at the end moment of the first time segment, to serve as a factor interfering with an analysis of a user behavior by the search engine server based on the true search request, to prevent the search engine server from analyzing the user behavior based on the search word entered by the user.

With reference to any one of the first aspect or the foregoing possible implementations, in a possible implementation of the first aspect, the sending the forged search request to the search engine server includes: sending a second search request to the search engine server at a first time, where the second search request is a forged search request or a true search request; and sending the forged search request to the search engine server at a second time, where there is a time interval between the first time and the second time, and the second search request is a search request previous to the forged search request.

A time interval between sending of two consecutive search requests is ensured by using the time interval between the first time and the second time, so that the moment at which the forged search request is sent does not coincide with a moment at which a previous search request (where the previous search request may be a true search request or may be a forged search request) is sent, thereby enabling the sending of the forged search request to be closer to the user behavior of sending the true search request.

With reference to any one of the first aspect or the foregoing possible implementations, in a possible implementation of the first aspect, the time interval between the first time and the second time is determined by using a Poisson procedure.

The time interval between the first time and the second time is determined by using the Poisson procedure, so that events of sending search requests at the first time and the second time are closer to random events, thereby enabling the sending of the forged search request to be closer to the user behavior of sending the true search request.

With reference to any one of the first aspect or the foregoing possible implementations, in a possible implementation of the first aspect, the time interval t is determined based on a probability density function $p(t; \hat{\lambda})=\hat{\lambda}e^{-\hat{\lambda}t}$, where $\hat{\lambda}$ is determined by using maximum-likelihood estimation $$\hat{\lambda} = \frac{N}{\sum_{i=1}^{N} t_i}$$

based on a time interval $t_i$ for sending the true search request, and N indicates a quantity of times of sending the true search request.

A time interval between the sending of the forged search request and the sending of the previous search request is constructed based on the time interval for sending the true search request, thereby enabling the sending of the forged search request to be closer to the user behavior of sending the true search request.

With reference to any one of the first aspect or the foregoing possible implementations, in a possible implementation of the first aspect, the method further includes: receiving a search result sent by the search engine server, where the search result is a search result determined based on the forged search request; and deleting the search result.

The search result corresponding to the forged search request is directly deleted, and the search result is not presented to the user, so that the user does not receive much unrelated information, thereby improving user experience.

With reference to any one of the first aspect or the foregoing possible implementations, in a possible implementation of the first aspect, the forged search word is a randomly determined search word.

Complexity for the search engine server to analyze a behavior habit and an interest of the user by using the randomly determined forged search word is increased, to prevent the search engine server from analyzing the user behavior based on the search word entered by the user.

With reference to any one of the first aspect or the foregoing possible implementations, in a possible implementation of the first aspect, the forged search word is a search word that has time validity and that is selected from a hot search word table of the search engine client.

The search word having time validity is selected from the hot search word table of the search engine client as the forged search word, so that the forged search word has a relatively wide selection range and strong time validity. The complexity for the search engine server to analyze the behavior habit and the interest of the user is increased, to prevent the search engine server from analyzing the user behavior based on the search word entered by the user.

With reference to any one of the first aspect or the foregoing possible implementations, in a possible implementation of the first aspect, the forged search word is a search word randomly determined in a search word library, and the search word library is periodically updated from a network based on a preset time period.

A search word is periodically obtained from the network, to update content of the search word library, so that the forged search word is more diversified, and the complexity for the search engine server to analyze the behavior habit and the interest of the user is increased, to prevent the search engine server from analyzing the user behavior based on the search word entered by the user.

According to a second aspect, this application provides an apparatus for sending a search request. The apparatus includes a module configured to perform the method in the first aspect.

According to a third aspect, this application provides an apparatus for sending a search request. The apparatus includes: a memory, a processor, an input/output interface, a communications interface, and a bus system. The memory, the processor, the input/output interface, and the communications interface are connected to each other by using the bus system. The memory is configured to store an instruction. The processor is configured to execute the instruction stored in the memory. When the instruction is executed, the processor performs the method in the first aspect by using the communications interface, and controls the input/output interface to receive input data and information, and output data such as an operation result.

According to a fourth aspect, this application provides a computer readable storage medium. The computer readable storage medium is configured to store program code of a method for sending a search request. The program code is used to execute an instruction for the method in the first aspect.

In some implementations, the search engine client may be a user interface of a search engine, and is configured to: receive search content entered by the user, display a search result, provide a user relevancy feedback mechanism, and so on.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

For the convenience of understanding, a schematic block diagram of a system architecture for a method for sending a search request according to an embodiment of the present invention is briefly described with reference to FIG. 1. User equipment 110 shown in FIG. 1 includes a search engine client 120, a forged search engine client 130, and a communications interface 140. The search engine client 120 and the forged search engine client 130 may perform information transmission with the search engine server 150 by using the communications interface 140.

Specifically, the search engine server 150 includes a searcher, an indexer, and a retrieval device. The searcher is configured to: roam on the Internet, and discover and collect information. The indexer is configured to: understand the information found by the searcher, extract a document represented by index entries, and generate an index table of a document library. The retrieval device is configured to: quickly retrieve a document in an index library based on a search request, evaluate relevance between the document and the search request, and sort to-be-output search results based on relevance.

Figure 1:
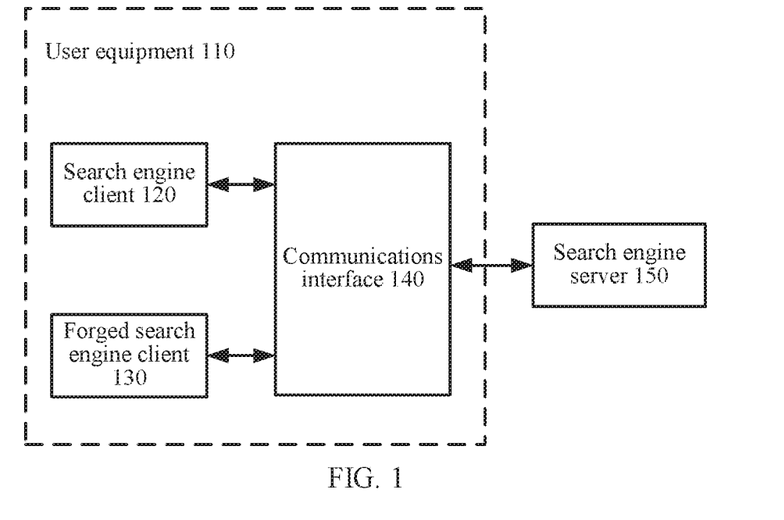
FIG. 1 is a schematic block diagram of a system architecture for a method for sending a search request according to an embodiment of the present invention.

It should be understood that, the user equipment (also referred to as a terminal device) shown in FIG. 1 may include a mobile phone, a tablet computer, a PDA (Personal Digital Assistant, personal digital assistant), a POS (Point of Sales, point of sales), an in-vehicle computer, and the like.

It should be further understood that, the forged search engine client may be a plug-in of a system in the user equipment, or may be a program or an application that is independently run in the user equipment, and an operation performed on the search engine client by a user may be monitored by using the forged search engine client. A form in which the forged search engine client is presented is not specifically limited in the present invention.

Figure 2:
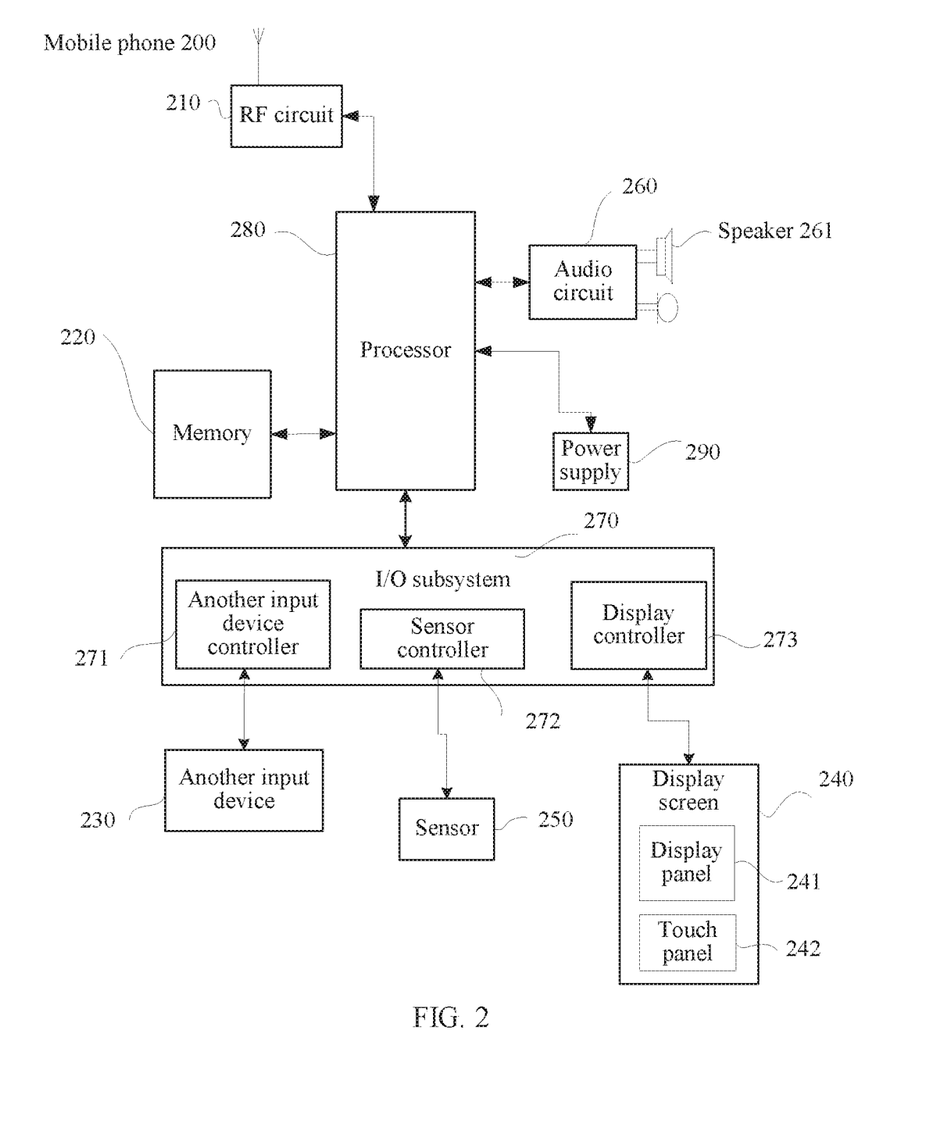
FIG. 2 is a schematic block diagram of a hardware structure of a mobile phone related to an embodiment of the present invention.

Using an example in which the user equipment shown in FIG. 1 is a mobile phone, and with reference to a schematic block diagram of a hardware architecture of the mobile phone shown in FIG. 2, an application scenario of the method for sending the search request according to implementation of the present invention is described in detail.

FIG. 2 is a schematic block diagram of a hardware structure of a mobile phone related to an embodiment of the present invention. The mobile phone 200 shown in FIG. 2 includes: components such as a radio frequency (Radio Frequency, RF) circuit 210, a memory 220, another input device 230, a display screen 240, a sensor 250, an audio circuit 260, an input/output (Input/Output, I/O) subsystem 270, a processor 280, and a power supply 290. Persons skilled in the art may understand that the structure of the mobile phone shown in FIG. 2 does not constitute a limitation to the mobile phone, and the mobile phone may include more components or fewer components than those shown in the figure, or some components may be combined, or some components may be separated, or a different component deployment may be used. Persons skilled in the art may understand that the display screen 240 belongs to a user interface (UI, User Interface), and the mobile phone 200 may include more or fewer user interfaces than those shown in the figure.

The following specifically describes the components of the mobile phone 200 with reference to FIG. 2.

The RF circuit 210 may be configured to receive and send information and receive and send a signal during a call process. Particularly, the RF circuit receives downlink information from a base station, then delivers the downlink information to the processor 280 for processing, and sends related uplink data to the base station. Generally, the RF circuit includes, but is not limited to, an antenna, at least one amplifier, a transceiver, a coupler, an LNA (Low Noise Amplifier, low noise amplifier), a duplexer, and the like. In addition, the RF circuit 210 may also communicate with a network and another device through wireless communication. The wireless communication may use any communications standard or protocol, including but not limited to GSM (Global System of Mobile communication, Global System for Mobile communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Messaging Service, Short Messaging Service), and the like.

The memory 220 may be configured to store a software program and a module. The processor 280 runs the software program and the module stored in the memory 220, to execute various functional applications and data processing of the mobile phone 200. The memory 220 may mainly include a program storage area and a data storage area. The program storage area may store an operating system, an application program required by at least one function (such as a sound playback function and an image display function), and the like. The data storage area may store data (such as audio data and a phone book) created based on use of the mobile phone 200, and the like. In addition, the memory 220 may include a high speed random access memory, and may further include a nonvolatile memory, such as at least one magnetic disk storage device, a flash memory, or another volatile solid-state storage device.

The another input device 230 may be configured to receive input digit or character information, and generate a keyboard signal input related to user setting and function control of the mobile phone 200. Specifically, the another input device 130 may include but is not limited to one or more of a physical keyboard, a function key (for example, a volume control key or a power on/off key), a trackball, a mouse, a joystick, or an optical mouse (the optical mouse is a touch-sensitive surface that does not display a visible output, or an extension of a touch-sensitive surface formed by a touchscreen). The another input device 230 is connected to another input device controller 271 of the I/O subsystem 270, and exchanges a signal with the processor 280 under control of the another device input controller 271.

The display screen 240 may be configured to display information entered by a user or information provided to a user, and various menus of the mobile phone 200, and may further receive a user input. Specifically, the display screen 240 may include a display panel 241 and a touch panel 242. The display panel 241 may be configured by using an LCD (Liquid Crystal Display, liquid crystal display), an OLED (Organic Light-Emitting Diode, organic light-emitting diode), or the like. The touch panel 242 is also referred to as a touchscreen, a touch-sensitive screen, or the like, and may collect a touch operation or non-touch operation of a user on or near the touch panel (such as an operation of a user on the touch panel 242 or near the touch panel 242 by using any suitable object or accessory such as a finger or a stylus, or including a motion sensing operation including operation types such as an isolated control operation and a multipoint control operation), and drives a corresponding connection apparatus according to a preset program. Optionally, the touch panel 242 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and sends the information to the processor 280, and can receive a command sent by the processor 280 and execute the command. In addition, the touch panel 242 may be a resistive, capacitive, infrared, or surface sound wave type touch panel, or the touch panel 242 may be implemented by using any technology of future development. Further, the touch panel 242 may cover the display panel 241. The user may perform, based on content (the displayed content includes, but is not limited to, a soft keyboard, a virtual mouse, a virtual key, an icon, and the like) displayed on the display panel 241, an operation on or near the touch panel 242 covering the display panel 241. After detecting the operation on or near the touch panel 242, the touch panel 242 transfers the operation to the processor 280 by using the I/O subsystem 270, to determine the user input. Subsequently, the processor 280 provides a corresponding visual output on the display panel 241 by using the I/O subsystem 270 based on the user input. Although, in FIG. 2, the touch panel 242 and the display panel 241 are used as two separate parts to implement input and output functions of the mobile phone 200, in some embodiments, the touch panel 242 and the display panel 241 may be integrated to implement the input and output functions of the mobile phone 200.

The mobile phone 200 may further include at least one sensor 250, such as an optical sensor, a motion sensor, and another sensor. Specifically, the optical sensor may include an ambient light sensor and a proximity sensor. The ambient light sensor may adjust luminance of the display panel 241 depending on brightness of the ambient light. The proximity sensor may switch off the display panel 241 and/or backlight when the mobile phone 200 is moved to the ear. As one type of motion sensor, an acceleration sensor may detect magnitude of accelerations in various directions (usually on three axes), may detect magnitude and a direction of the gravity when the mobile phone 200 is static, and may be applied to an application that recognizes the gesture of the mobile phone (for example, switching between landscape orientation and portrait orientation, a related game, and magnetometer gesture calibration), a function related to vibration recognition (such as a pedometer and a knock), and the like. For other sensors such as a gyroscope, a barometer, a hygrometer, a thermometer, and an infrared sensor that may be further configured for the mobile phone 200, details are not described herein.

The audio circuit 260, a speaker 261, and a microphone 262 may provide audio interfaces between the user and the mobile phone 200. The audio circuit 260 may convert received audio data into a signal and transmit the signal to the speaker 261. The speaker 261 converts the signal into a sound signal for output. On the other hand, the microphone 262 converts a collected sound signal into a signal. The audio circuit 260 receives the signal and converts the signal into audio data, and outputs the audio data to the RF circuit 208 to send the audio data to, for example, another mobile phone, or outputs the audio data to the memory 220 for further processing.

The I/O subsystem 270 is configured to control input and output peripheral devices, and may include the another device input controller 271, a sensor controller 272, and a display controller 273. Optionally, one or more another input control device controllers 271 receive a signal from the another input device 230 and/or send a signal to the another input device 230. The another input device 230 may include a physical button (a pressing button, a rocker button, and the like), a dial pad, a slider switch, a joystick, a click scroll wheel, or an optical mouse (the optical mouse is a touch-sensitive surface that does not display a visible output, or an extension of a touch-sensitive surface formed by a touchscreen). It should be noted that, the another input control device controller 271 may be connected to any one or more of the foregoing devices. The display controller 273 in the I/O subsystem 270 receives a signal from the display screen 240 and/or sends a signal to the display screen 240. After the display screen 240 detects the user input, the display controller 273 converts the detected user input into interaction with an object displayed on the user interface of the display screen 240. That is, man-machine interaction is implemented. The sensor controller 272 may receive a signal from one or more sensors 250 and/or may send a signal to the one or more sensors 250.

The processor 280 is a control center of the mobile phone 200, and is connected to various parts of the mobile phone by using various interfaces and lines. By running or executing the software program and/or the module stored in the memory 220, and invoking data stored in the memory 220, the processor 280 performs various functions and data processing of the mobile phone 200, thereby performing overall monitoring on the mobile phone. Optionally, the processor 280 may include one or more processing units. Preferably, the processor 280 may integrate an application processor and a modem processor. The application processor mainly processes an operating system, a user interface, an application program, and the like. The modem processor mainly processes wireless communication. It may be understood that the foregoing modem processor may alternatively not be integrated into the processor 280.

The mobile phone 200 further includes the power supply 290 (such as a battery) supplying power to the components. Preferably, the power supply may be logically connected to the processor 280 by using a power management system, to implement functions such as management of charging, discharging, and energy consumption by using the power management system.

Although not shown, the mobile phone 200 may further include a camera, a Bluetooth module, and the like, and details are not described herein.

It should be understood that, this embodiment of the present invention is not limited to be implemented in the hardware architecture in FIG. 2, and may be implemented in another user terminal device, for example, a terminal device on which a search engine can be used, such as a personal computer, a PAD, a tablet computer, an intelligent wearable device, or an embedded system device. Details about a hardware architecture of the foregoing device are not described herein.

Figure 3:
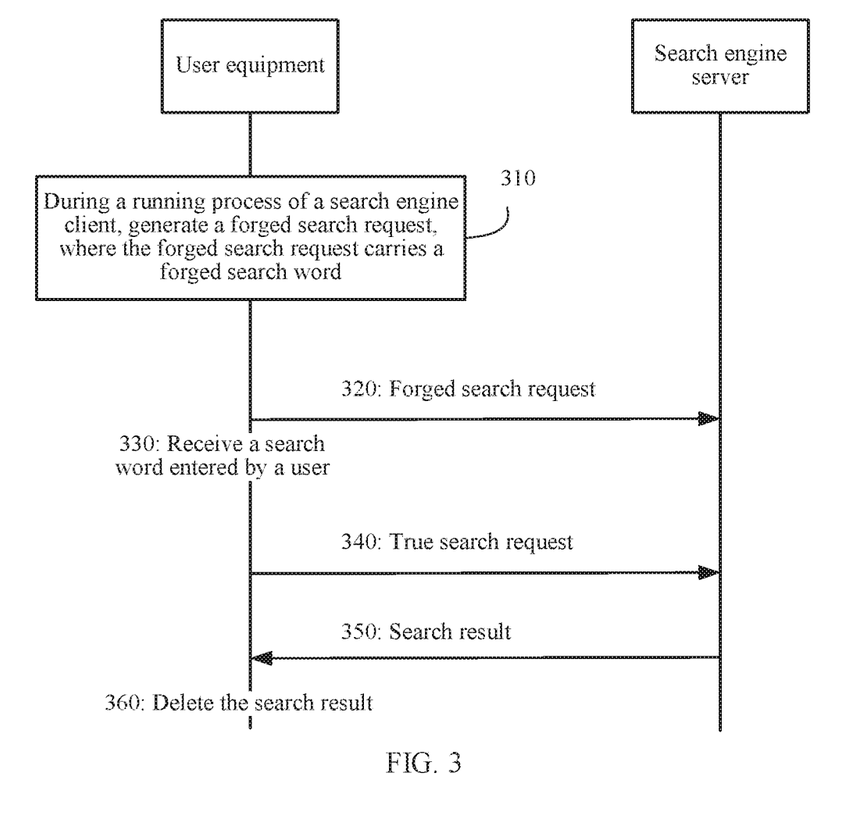
FIG. 3 is a schematic flowchart of a method for sending a search request according to implementation of the present invention.

Based on the hardware architectures shown in FIG. 1 and FIG. 2, the following describes in detail a method for sending a search request according to implementation of the present invention with reference to FIG. 3.

FIG. 3 is a schematic flowchart of a method for sending a search request according to implementation of the present invention. The method may be performed by the user equipment 110 shown in FIG. 1. It should be understood that, FIG. 3 shows detailed steps or operations of the method for sending a search request, but these steps and operations are only an example. In this embodiment of the present invention, and another operation or variants of the operations in FIG. 3 may alternatively be performed. In addition, the steps in FIG. 3 may be performed in an order different from that presented in FIG. 3, and the operations in FIG. 3 may not necessarily be all performed. The following specifically describes the steps of the method shown in FIG. 3.

310: During a running procedure of a search engine client, generate a forged search request, where the forged search request carries a forged search word.

Specifically, the forged search request is generated within a time segment corresponding to the running procedure of the search engine client. The time segment corresponding to the running procedure of the search engine client may be a time segment from starting the search engine client by a user to quitting the search engine client by the user.

Optionally, in an embodiment, the forged search word may be a randomly determined search word.

Optionally, in an embodiment, the forged search word is a search word randomly determined in a search word library, and the search word library is periodically updated from a network based on a preset time period.

It should be understood that, the search word library may be periodically updated from the network, or may be obtained from the network at a randomly determined time. In the present invention, an update time of the search word library is not specifically limited.

It should be further understood that, the forged search word may be a general search word or a search word having time validity. The general search word may be a search word that does not have time validity, has a relatively long life cycle, and does not suddenly perish or come into being, for example, a website name or a page title. The search word having time validity may be a search word that has relatively strong time validity and a relatively short life cycle, for example, a hot search word such as the explosion in Tianjin port, the eighteenth CPC national congress, or the Paris terrorism attack. This type of search word may be periodically updated from a hot search word table of a search engine.

It should be further understood that, the forged search word may be randomly obtained from the search word library on the forged search engine client. When the search word library stores a sufficient quantity of search words, the forged search request generated based on the randomly obtained search word has sufficient randomness, and regularity is not easy to be mined by the search engine server. In this embodiment of the present invention, a manner of obtaining a search word is not specifically limited.

Optionally, in an embodiment, the during a running procedure of a search engine client, generating a forged search request further includes: determining a generation delay for generating the forged search request; determining that the search engine client does not send a first search request within a first time segment, where the first search request is a forged search request or a true search request, and the first time segment is a time segment that lasts for the generation delay and that starts from a running start moment of the search engine client that is used as a current moment; and generating the forged search request at an end moment of the first time segment.

Specifically, timing may be simultaneously started when the user starts the search engine server. After the generation delay, if the first search request is not sent to the search engine server within the time segment, the forged search request may be immediately generated at a moment at which the first time segment ends.

The generation delay may refer to a time segment of waiting required to generate the forged search request.

For example, a timer may be simultaneously started to begin timing when the user starts the search engine server. After the time segment corresponding to the generation delay, if the first search request (where the first search request may be a forged search request or a true search request) is not sent to the search engine server within a time segment of the timing of the timer, a moment at which the timer ends the timing may be used as a moment at which the forged search request is sent.

It should be noted that, the forged search request and the true search request may serve as attributes of the first search request. The forged search request may be a search request carrying a forged search word, and the true search request may be a search request sent by the user to the search engine server by using the search engine client.

It should be understood that, the generation delay for the forged search request may be randomly determined or preset. This is not specifically limited in the present invention.

320: Send the forged search request to a search engine server.

Specifically, the forged search request is sent to the search engine server during the running procedure of the search engine client.

When the forged search request is sent, a search request may be sent based on a parameter format stipulated by the search engine. For example, for the Google (Google) search engine, a search request for querying for "barack obama" may be sent by using the following commands:

curl—b "<cookie_name>=<cookie_value>"
—header "X_GSA_USER:<user_name>"
—header "X_GSA_CREDENTIAL_GROUP:<credential_group_name>"
http://www.mycompany.com/search?q=barack+obama&access=a.

It should be noted that, each search request (including a forged search request and a true search request) sent to the search engine server carries a connection ID (Session ID), and after receiving a search result fed back by the search engine server based on a search word carried in the search request, a system sends, based on the connection ID, the search result to a search engine client or a forged search engine client corresponding to the connection ID.

Optionally, during the running procedure of the search engine client, a time for sending the forged search request may be determined by monitoring an operation performed by the user by using the search engine client. The operation performed by the user by using the search engine client may include an operation, for example, starting, by the user, the search engine client; including, by a search text box of the search engine client, a character entered by the user; clicking, by the user, a "Submit" button on the search engine client; or closing, by the user, the search engine client.

If the starting, by the user, the search engine client is detected, the forged search engine client may be started to run a process of generating the forged search request, and prepare to send the forged search request. If entering, by the user, a character in the search text box is detected, the forged search engine pauses sending the forged search request; if the clicking, by the user, a "Submit" button on the search engine client is detected, the forged search engine client continues to run the process (procedure) of generating the forged search request, and sends the forged search request. If the closing, by the user, the search engine client is detected, running of the forged search engine client is ended.

It should be understood that, the user may enter a character in the search text box of the search engine client by using an input apparatus (such as a keyboard) corresponding to the user equipment; or the user may enter a character in the search text box of the search engine client by using a voice input apparatus (such as a microphone) of the user equipment; or the user may enter a character in a search text box of the search engine by clicking a hot search word on a web page displayed on the search engine client. In this embodiment of the present invention, a manner in which the user enters a character in the search text box is not specifically limited.

It should be further understood that, during the running procedure of the search engine client, the time for sending the forged search request may be determined by monitoring the operation performed by the user by using the search engine client; or whether the search engine server sends a search request may be listened to, to determine whether the search engine client sends the search request to the search engine server, and determine the time for sending the forged search request. This is not specifically limited in the present invention.

Optionally, the method shown in FIG. 3 further includes the following step.

330: Receive a search word entered by a user.

Specifically, during the running procedure of the search engine client, the search word entered by the user is received.

It should be understood that, step 310, step 320, and step 330 are not limited to a strict chronological sequence. For example, step 330 may be performed before step 320. To be specific, during the running procedure of the search engine client, the forged search request is generated, and after receiving the search word entered by the user, the user equipment sends the forged search request to the search engine server. Step 310, step 320, and step 330 are not specifically limited to a chronological sequence in the present invention.

Optionally, the method shown in FIG. 3 further includes the following step.

340: Generate a true search request based on the search word entered by the user, and send the true search request to the search engine server, where a time difference between the sending of the forged search request and the sending of the true search request is within a predetermined range.

Specifically, a time difference between performing of step 320 and performing of step 340 is within the predetermined range. To be specific, the time difference between a time for sending the forged search request and a time for sending the true search request may be within a preset time range. That is, the forged search request may be sent within a time segment close to a moment at which the user sends the true search request.

It should be understood that, step 320 and step 340 are not limited to a chronological sequence. For example, the user equipment may first perform step 340, and then perform step 320, to be specific, first send the true search request to the search engine server, and then send the forged search request to the search engine server, so that the time difference between the time for sending the true search request and the time for sending the forged search request is within the preset time range.

Optionally, in an embodiment, step 320 further includes: sending a second search request to the search engine server at a first time, where the second search request is a forged search request or a true search request; and sending the forged search request to the search engine server at a second time, where there is a time interval between the first time and the second time, and the second search request is a search request previous to the forged search request.

Specifically, the first time and the second time may belong to a time segment within the running procedure of the search engine client.

It should be noted that, the forged search request and the true search request may serve as attributes of the second search request. The forged search request may be a search request carrying a forged search word, and the true search request may be a search request sent by the user to the search engine server by using the search engine client.

Optionally, in an embodiment, the time interval between the first time and the second time is determined by using a Poisson procedure.

It should be understood that, the time interval may be alternatively generated by randomly constructing a random number. When the time interval is generated by randomly constructing a random number, the time interval may have a large difference from a time interval at which the user sends a search request by using the search engine server. In this case, the forged search request interferes with only an analysis performed by the search engine server on an interest range of the user. In this embodiment of the present invention, a construction manner for generating the time interval is not specifically limited.

Optionally, in an embodiment, the time interval t is determined based on a probability density function $p(t; \hat{\lambda}) = \hat{\lambda} e^{-\hat{\lambda} t}$, where $\hat{\lambda}$ is determined by using maximum-likelihood estimation $$\hat{\lambda} = \frac{N}{\sum_{i=1}^{N} t_i}$$

based on a time interval $t_i$ for sending the true search request, and N indicates a quantity of times of sending the true search request.

Figure 4:
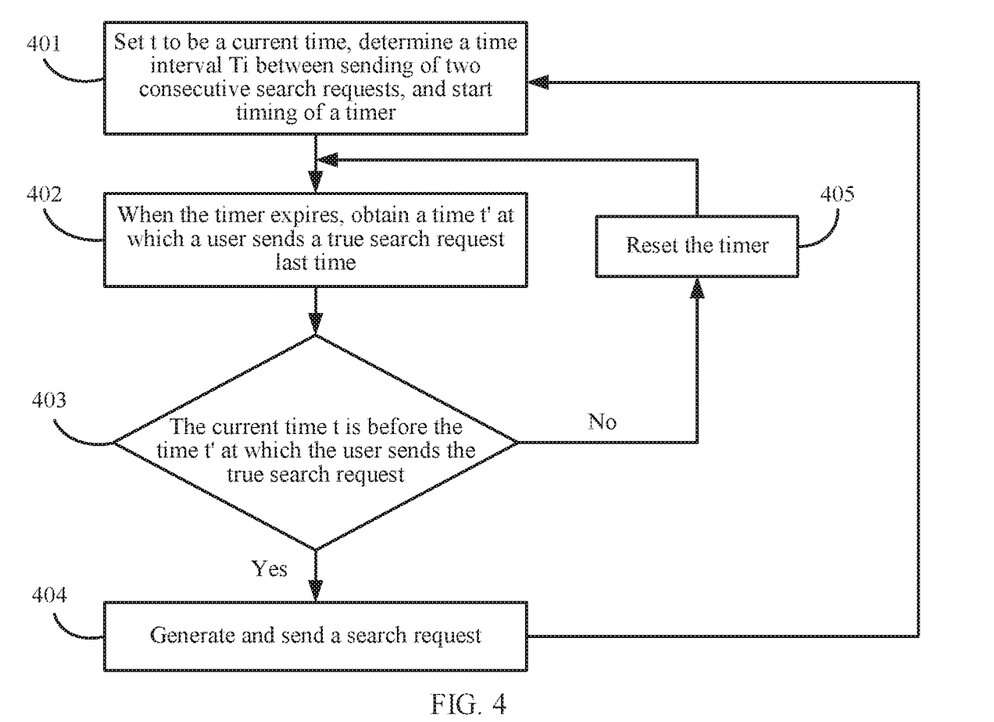
FIG. 4 is a schematic flowchart of a method for sending a forged search request according to an embodiment of the present invention.

Specifically, two consecutive search requests may be simulated by using the Poisson procedure, so that a time interval between the two consecutive search requests complies with exponential distribution. A method for sending a forged search request is specifically described with reference to FIG. 4. FIG. 4 is a schematic flowchart of a method for sending a forged search request according to an embodiment of the present invention.

401: Set t to be a current time, determine the time interval Ti between sending of two consecutive search requests, and start timing of a timer.

402: When the timer expires, obtain a time t' at which a user sends a true search request last time.

Specifically, when the timer expires, in other words, when a time that is set in the timer for sending a forged search request arrives, the forged search request is not sent, and then the time t' at which the user performs search last time is obtained.

It should be noted that, that when a time that is set in the timer for sending a forged search request arrives, the forged search request is not sent in the foregoing may be a result of that sending of the forged search request is paused when it is detected that the user enters a character in a search text box. A cause of the expiration of the timer is not specifically limited in the present invention.

403: Determine a chronological sequence between the current time t and the time t' at which the user sends a forged search request last time.

If t≥t', it indicates that within a time interval Ti (to be specific, within a time segment of the timing of the timer), the user does not send the true search request, and in this case, step 404 may be performed.

If t<t', it indicates that within a time interval Ti (to be specific, within a time segment of the timing of the timer), the user sends the true search request, and step 405 is performed.

404: Generate and send a search request.

Specifically, after the forged search request is sent, a sending time of the forged search request is set to be the current time t, and step 401 is performed.

405: Reset the timer.

Specifically, because the user sends the true search request within the time segment of the timing of the timer, to ensure that a time interval between any two search requests satisfies the foregoing determined time interval, the time t' at which the user sends the true search request is determined as a start point of the timing of the timer, and $T_i'=t'-t$ is set to be a time interval for sending a next forged search request.

It should be noted that, a time of Ti−(t'−t) has elapsed since t', and therefore the timer is adjusted, so that the forged search request is sent after an interval of $T_i'=t'-t$ since the time t' at which the user sends the true search request. Step 402 is performed.

Optionally, the method shown in FIG. 3 further includes the following step.

350: Receive a search result sent by the search engine server, where the search result is a search result determined based on the forged search request.

Specifically, search result sent by the search engine server is received, and the search result is the search result determined based on the forged search request.

It should be understood that, the search result may be presented to the user in a form of a search result page (Search engine results page, SERP). The search result page may be a result page that is fed back by the search engine server for the forged search request. Usually, the search result page includes a search result list. Each search result usually includes: a title of a search result web page, a link to the search result web page, and a text summary that is about the web page and that matches a search keyword. In addition to the foregoing basic information, sometimes the search engine server further provides some other information based on a situation to a link cached by the search result page, for example, a date and a time of a last captured page, a file size of the search result page, another search-result-related link on a same website, and other related information on the search result page, such as a comment, a score, and contact information. A search result presentation form is not specifically limited in this embodiment of the present invention.

Optionally, the method shown in FIG. 3 further includes the following step.

360: Delete the search result.

The forged search request is sent to the search engine server, to serve as a factor interfering with an analysis of a user behavior by the search engine server based on the true search request, to prevent the search engine server from analyzing the user behavior based on a search word entered by the user, thereby improving user experience. It is avoided that, in the prior art, the search engine server analyzes the user behavior based on the search word entered by the user.

The foregoing describes the method for sending a search request according to the embodiments of the present invention in detail with reference to FIG. 1 to FIG. 4. The following describes an apparatus for sending a search request according to an embodiment of the present invention in detail with reference to FIG. 5 and FIG. 6. It should be understood that, the apparatuses shown in FIG. 5 and FIG. 6 can implement the steps in FIG. 3. To avoid repetition, details are not described herein again.

Figure 5:
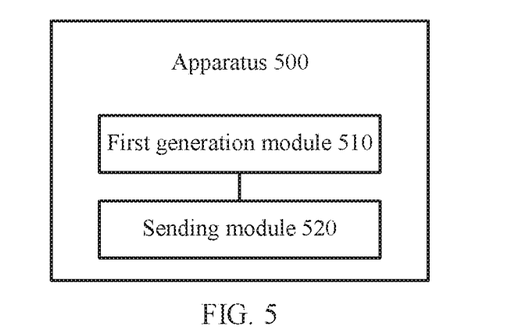
FIG. 5 is a schematic block diagram of an apparatus for sending a search request according to an embodiment of the present invention.

FIG. 5 is a schematic block diagram of an apparatus for sending a search request according to an embodiment of the present invention. The apparatus 500 shown in FIG. 5 includes: a first generation module 510 and a sending module 520.

The first generation module 510 is configured to: during a running procedure of a search engine client, generate a forged search request, where the forged search request carries a forged search word.

The sending module 520 is configured to send the forged search request generated by the generation module to the search engine server.

The forged search request is sent to the search engine server, to serve as a factor interfering with an analysis of a user behavior by the search engine server based on a true search request, to prevent the search engine server from analyzing the user behavior based on a search word entered by a user, thereby improving user experience. It is avoided that, in the prior art, the search engine server analyzes the user behavior based on the search word entered by the user.

Optionally, in an embodiment, the apparatus further includes: a first receiving module, configured to receive a search word entered by a user; and a second generation module, configured to: generate a true search request based on the search word entered by the user, and send the true search request to the search engine server, where a time difference between the sending of the forged search request and the sending of the true search request is within a predetermined range.

Optionally, in an embodiment, the first generation module is specifically configured to: determine a generation delay for generating the forged search request; determine that the search engine client does not send a first search request within a first time segment, where the first search request is a forged search request or a true search request, and the first time segment is a time segment that lasts for the generation delay and that starts from a running start moment of the search engine client that is used as a current moment; and generate the forged search request at an end moment of the first time segment.

Optionally, in an embodiment, the sending module is specifically configured to: send a second search request to the search engine server at a first time, where the second search request is a forged search request or a true search request; and send the forged search request to the search engine server at a second time, where there is a time interval between the first time and the second time, and the second search request is a search request previous to the forged search request.

Optionally, in an embodiment, the time interval between the first time and the second time is determined by using a Poisson procedure.

Optionally, in an embodiment, the time interval t is determined based on a probability density function $p(t; \hat{\lambda})=\hat{\lambda}e^{-\hat{\lambda}t}$, where $\hat{\lambda}$ is determined by using maximum-likelihood estimation $$\hat{\lambda} = \frac{N}{\sum_{i=1}^{N} t_i}$$

based on a time interval $t_i$ for sending the true search request, and N indicates a quantity of times of sending the true search request.

Optionally, in an embodiment, the apparatus further includes: a second receiving module, configured to receive a search result sent by the search engine server, where the search result is a search result determined based on the forged search request; and a deletion module, configured to delete the search result.

Optionally, in an embodiment, the forged search word is a randomly determined search word.

Optionally, in an embodiment, the forged search word is a search word randomly determined in a search word library, and the search word library is periodically updated from a network based on a preset time period.

Optionally, in an embodiment, the forged search word is a search word that has time validity and that is selected from a hot search word table of the search engine client.

Figure 6:
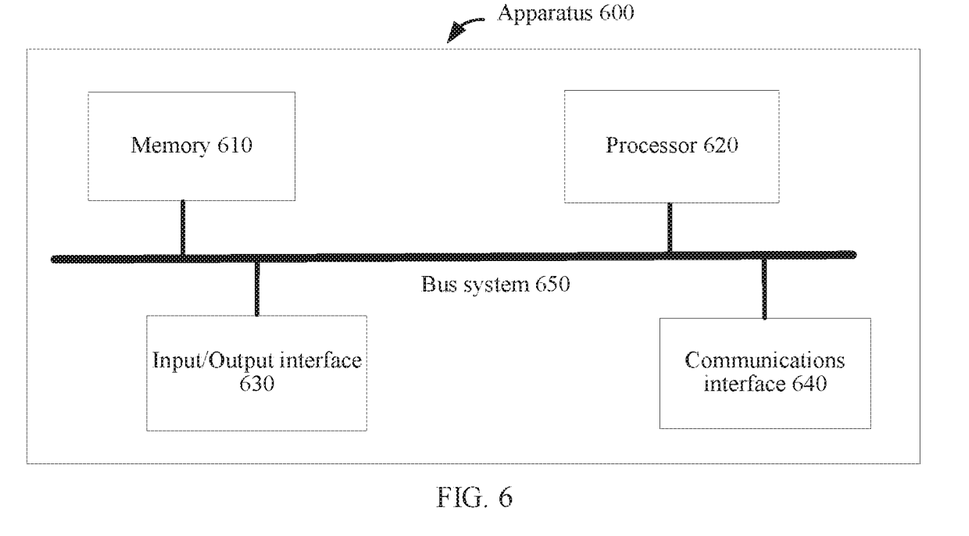
FIG. 6 is a schematic block diagram of an apparatus for sending a search request according to an embodiment of the present invention.

FIG. 6 is a schematic block diagram of an apparatus for sending a search request according to an embodiment of the present invention. The apparatus 600 shown in FIG. 6 includes: a memory 610, a processor 620, an input/output interface 630, a communications interface 640, and a bus system 650. The memory 610, the processor 620, the input/output interface 630, and the communications interface 640 are connected to each other by using the bus system 650. The memory 610 is configured to store an instruction. The processor 620 is configured to execute the instruction stored in the memory 610, to control the input/output interface 630 to receive input data and information, and output data such as an operation result, and control the communications interface 640 to send a signal.

The processor 620 is configured to: during a running procedure of a search engine client, generate a forged search request, where the forged search request carries a forged search word.

The communications interface 640 is configured to send the forged search request to the search engine server.

It should be understood that, in this embodiment of the present invention, the processor 620 may use a general central processing unit (Central Processing Unit, CPU), a microprocessor, an application-specific integrated circuit (Application Specific Integrated Circuit, ASIC), or one or more integrated circuits to execute a related program, to implement technical solutions in embodiments of the present invention.

It should be further understood that, the communications interface 640 uses a receiving and sending apparatus, for example, but not limited to, a transceiver, to implement communication between the mobile terminal 600 and another device or another communications network.

The memory 610 may include a read-only memory and a random access memory, and provide an instruction and data to the processor 620. A part of the processor 620 may further include a non-volatile random access memory. For example, the processor 620 may further store information about a device type.

The bus system 650 may further include a power bus, a control bus, a status signal bus, and the like, in addition to a data bus. However, for clear description, various types of buses in the figure are marked as the bus system 650.

In an implementation process, steps in the foregoing method can be implemented by using a hardware integrated logical circuit in the processor 620, or by using instructions in a form of software. With reference to this embodiment of the present invention, the disclosed method for sending a search request may be directly reflected by being performed and completed by the hardware processor, or being performed and completed by using a combination of hardware and a software module in the processor. The software module may be located in a mature storage medium in the field, such as a random access memory, a flash memory, a read-only memory, a programmable read-only memory, an electrically-erasable programmable memory, or a register. The storage medium is located in the memory 610, and a processor 620 reads information in the memory 610 and completes the steps in the foregoing method in combination with hardware of the processor. To avoid repetition, details are not described herein.

The forged search request is sent to the search engine server, to serve as a factor interfering with an analysis of a user behavior by the search engine server based on a true search request, to prevent the search engine server from analyzing the user behavior based on a search word entered by a user, thereby improving user experience. It is avoided that, in the prior art, the search engine server analyzes the user behavior based on the search word entered by the user.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working procedure of the foregoing system, apparatus, and unit, reference may be made to a corresponding procedure in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for sending a search request, comprising:
during a running procedure of a search engine client:
generating a forged search request, wherein the forged search request carries a forged search word; and
sending the forged search request to the search engine server, wherein sending the forged search request to the search engine server comprises:
sending a second search request to the search engine server at a first time, wherein the second search request is a forged search request or a true search request; and
sending the forged search request to the search engine server at a second time, wherein there is a time interval between the first time and the second time, and the second search request is a search request previous to the forged search request, wherein the time interval t between the first time and the second time is determined by using a Poisson procedure, wherein the time interval t is determined based on a probability density function $p(t; \hat{\lambda}) = \hat{\lambda} e^{-\hat{\lambda} t}$, where $\hat{\lambda}$ is determined by using a maximum-likelihood estimation $$\hat{\lambda} = \frac{N}{\sum_{i=1}^{N} t_i}$$

based on a time interval $t_i$ for sending the true search request, and N indicates a quantity of times of sending the true search request.

2. The method according to claim 1, wherein the method further comprises:
receiving a search word entered by a user; and
generating a true search request based on the search word entered by the user, and sending the true search request to the search engine server, wherein a time difference between the sending of the forged search request and the sending of the true search request is within a predetermined range.

3. The method according to claim 1, wherein generating the forged search request comprises:
determining a generation delay for generating the forged search request; determining that the search engine client does not send a first search request within a first time segment, wherein the first search request is a forged search request or a true search request, and the first time segment is a time segment that lasts for the generation delay and that starts from a running start moment of the search engine client that is used as a current moment; and
generating the forged search request at an end moment of the first time segment.

4. The method according to claim 1, wherein the method further comprises: receiving a search result that corresponds to the forged search request and that is sent by the search engine server; and deleting the search result.

5. The method according to claim 1, wherein the forged search word is a randomly determined search word.

6. An apparatus for sending a search request, the apparatus comprising:
a memory;
a processor; and
a transmitter;
wherein the memory is configured to store an instruction, wherein the processor is configured to execute the instruction stored in the memory to generate a forged search request during a running procedure of a search engine client, wherein the forged search request carries a forged search word,
wherein the transmitter is configured to send the forged search request generated by the generation module to the search engine server, and
wherein transmitter is configured to:
send a second search request to the search engine server at a first time, wherein the second search request is a forged search request or a true search request; and
send the forged search request to the search engine server at a second time, wherein there is a time interval t between the first time and the second time, and the second search request is a search request previous to the forged search request, wherein the time interval t between the first time and the second time is determined by using a Poisson procedure, wherein the time interval t is determined based on a probability density function $p(t; \hat{\lambda})=\hat{\lambda}e^{-\hat{\lambda}t}$, where $\hat{\lambda}$ is determined by using a maximum-likelihood estimation $$\hat{\lambda} = \frac{N}{\sum_{i=1}^{N} t_i}$$

based on a time interval ti for sending the true search request, and N indicates a quantity of times of sending the true search request.

7. The apparatus according to claim 6, wherein the processor is further configured to:
  receive a search word entered by a user; and
  generate a true search request based on the search word entered by the user, and send the true search request to the search engine server, wherein a time difference between the sending of the forged search request and the sending of the true search request is within a predetermined range.

8. The apparatus according to claim 6, wherein the processor is further configured to:
  determine a generation delay for generating the forged search request;
  determine that the search engine client does not send a first search request within a first time segment, wherein the first search request is a forged search request or a true search request, and the first time segment is a time segment that lasts for the generation delay and that starts from a running start moment of the search engine client that is used as a current moment; and
  generate the forged search request at an end moment of the first time segment.

9. The apparatus according to claim 6, wherein the processor is further configured to: receive a search result sent by the search engine server, wherein the search result is a search result determined based on the forged search request; and delete the search result.

10. The apparatus according to claim 6, wherein the forged search word is a randomly determined search word.

\* \* \* \* \*